(12) United States Patent
Häggander et al.

(10) Patent No.: US 8,689,540 B2
(45) Date of Patent: Apr. 8, 2014

(54) COMPONENT CONFIGURED FOR BEING SUBJECTED TO HIGH THERMAL LOAD DURING OPERATION

(75) Inventors: Jan Häggander, Trollhättan (SE); Arne Boman, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 1041 days.

(21) Appl. No.: 12/522,388

(22) PCT Filed: Feb. 13, 2007

(86) PCT No.: PCT/SE2007/000134
§ 371 (c)(1),
(2), (4) Date: Jul. 8, 2009

(87) PCT Pub. No.: WO2008/100186
PCT Pub. Date: Aug. 21, 2008

(65) Prior Publication Data
US 2010/0037589 A1 Feb. 18, 2010

(51) Int. Cl.
*F02K 9/00* (2006.01)
(52) U.S. Cl.
USPC .......................................................... 60/260
(58) Field of Classification Search
USPC ......... 60/257, 266, 752–760, 260; 239/127.1, 239/127.3
See application file for complete search history.

(56) References Cited

U.S. PATENT DOCUMENTS

| | | | | | |
|---|---|---|---|---|---|
| 3,004,386 | A | * | 10/1961 | Ledwith | 239/127.1 |
| 4,107,919 | A | * | 8/1978 | Sokolowski | 165/169 |
| 4,108,241 | A | * | 8/1978 | Fortini et al. | 165/146 |
| 4,879,874 | A | * | 11/1989 | Koyari et al. | 60/259 |
| 5,075,966 | A | * | 12/1991 | Mantkowski | 29/890.01 |
| 6,244,041 | B1 | * | 6/2001 | Vasin et al. | 60/258 |
| 2003/0183606 | A1 | * | 10/2003 | Lundgren | 219/121.63 |

FOREIGN PATENT DOCUMENTS

DE 2246075 A1 4/1974

OTHER PUBLICATIONS

Supplementary European Search Report (Jul. 30, 2012) for corresponding European App. EP 07 70 9349.
International Search Report for corresponding International Application PCT/SE2007/000134.
International Preliminary Report on Patentability for corresponding International Application PCT/SE2007/000134.

* cited by examiner

*Primary Examiner* — Phutthiwat Wongwian
*Assistant Examiner* — William Breazeal
(74) *Attorney, Agent, or Firm* — WRB-IP LLP

(57) ABSTRACT

A component configured for being subjected to a high thermal load during operation includes a wall structure with cooling channels adapted for handling a coolant flow. At least one first cooling channel is adapted to convey the coolant from a first portion of the component to a second portion of the component. At least one second cooling channel in the second portion is closed so that the coolant is at least substantially-prevented from entering the closed second cooling channel from a cooling channel in the first portion.

29 Claims, 3 Drawing Sheets

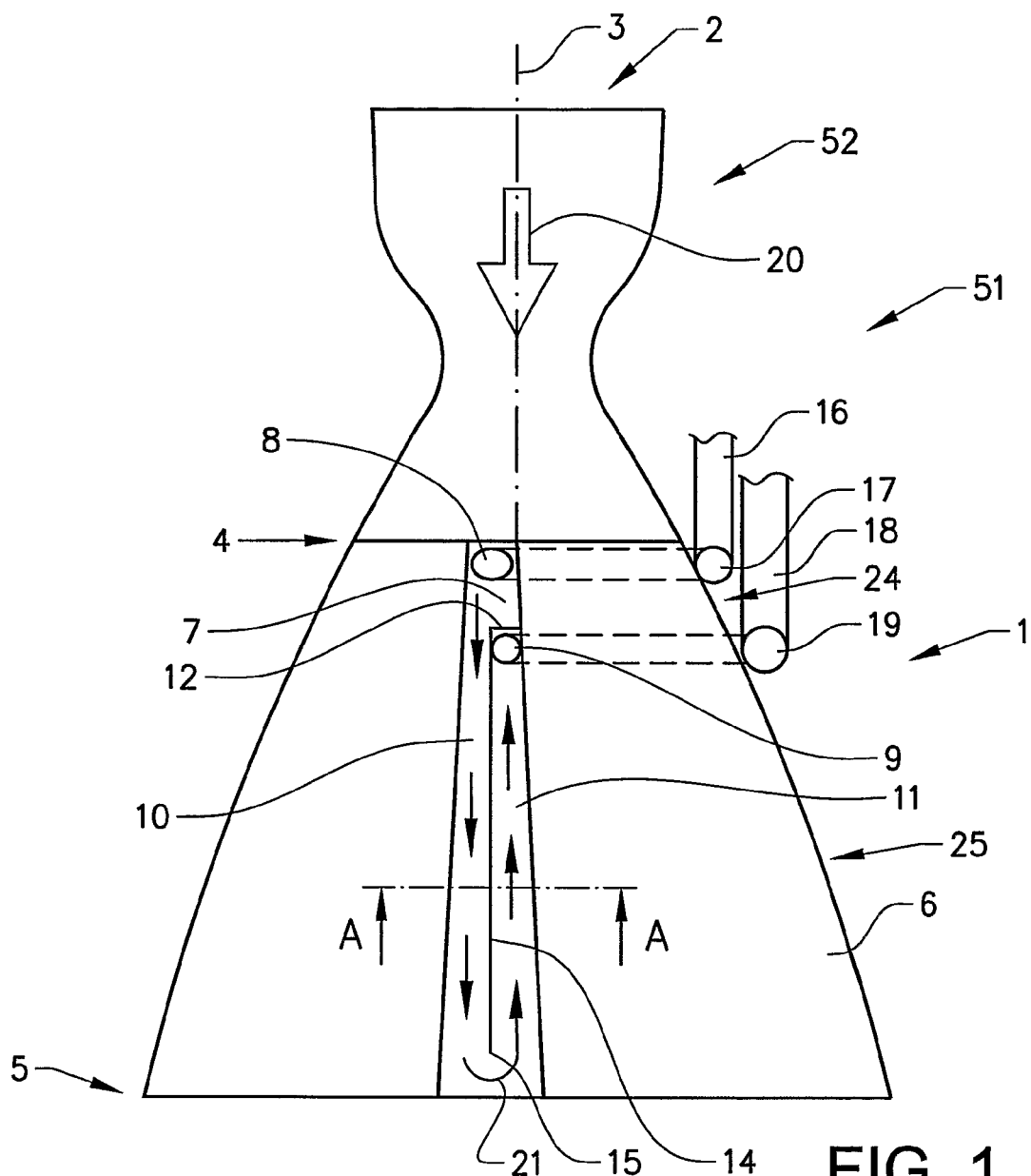
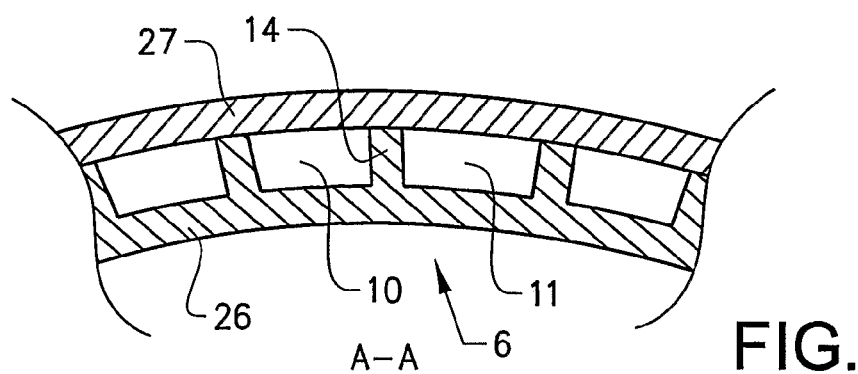
FIG. 1
FIG. 2

COMPONENT CONFIGURED FOR BEING SUBJECTED TO HIGH THERMAL LOAD DURING OPERATION

BACKGROUND AND SUMMARY

The present invention relates to a component configured for being subjected to a high thermal load during operation, comprising a wall structure with cooling channels adapted for handling a coolant flow, wherein at least one first cooling channel is adapted to convey the coolant from a first portion of the component to a second portion of the component.

The component will in the following be described for being used as a rocket engine component. This application should be regarded as preferred. However, also other applications are possible, such as for a jet motor or gas turbine.

The component is in operation actively cooled by a coolant flowing in said cooling channels. The coolant may further be used for combustion after having served as a coolant. The present invention is specifically designed for a regeneratively cooled liquid fuel rocket engine.

The rocket engine component in question forms a part of a combustion chamber and/or a nozzle for expansion of the combustion gases. The combustion chamber and the nozzle are together commonly referred to as a thrust chamber.

During operation, a rocket engine component forming a combustion chamber and/or an outlet nozzle is subjected to very high stresses. A nozzle is for example subjected to a very high temperature on its inside (in the magnitude of 800° K) and a very low temperature on its outside (in the magnitude of 50° K). As a result of this high thermal load, stringent requirements are placed upon the choice of material, design and manufacture of the nozzle. At least there is a need for an effective cooling of the nozzle.

The wall structure forming the nozzle has a tubular shape with a varying diameter along a centre axis. More specifically, the outlet nozzle wall structure has a conical or parabolic shape. The outlet nozzle normally has a diameter ratio from the aft or large outlet end to the forward or small inlet end in the interval from 2:1 to 4:1.

The outlet nozzle wall structure comprises cooling channels extending between an upstream end and a downstream end of the nozzle. According to one previously known design, the outlet nozzle wall structure comprises an inner wall, to which hot gas is admitted during engine operation and an outer wall, which is colder than the inner wall during engine operation. A plurality of elongated webs is adapted to connect the inner wall to the outer wall dividing the space between the walls into a plurality of cooling channels.

During engine operation, any cooling medium may be used to flow through the cooling channels. Regarding a rocket engine, the rocket engine fuel is normally used as a cooling medium in the outlet nozzle. The rocket engine may be driven with hydrogen or a hydrocarbon, i.e. kerosene, as a fuel. Thus, the fuel is introduced in a cold state into the wall structure, delivered through the cooling channels while absorbing heat via the inner wall and is subsequently used to generate the thrust. Heat is transferred from the hot gases to the inner wall, further on to the fuel, from the fuel to the outer wall, and, finally, from the outer wall to any medium surrounding it. Heat is also transported away by the coolant as the coolant temperature increases by the cooling. The hot gases may comprise a flame generated by combustion of gases and/or fuel.

The basic problem is to construct cooled nozzle walls that are capable of containing the hot gas and accelerate the gas and to be able to do so in a reliable way for a required number of engines service cycles. The coolant needs to be distributed in a precise way to use the available coolant in an efficient way and to avoid local deficiencies in cooling performance.

It is desirable to arrange coolant ducts to and from the nozzle in such a way that the size of manifolds and length of the ducts are minimized. Furthermore, it is desirable to place the manifolds in areas of the nozzle where it is protected from high level of vibration and external flow and heat loads. The previously known designs do not fully meet these requirements.

A first previously known design is a so-called single pass flow arrangement. The coolant inlet is at the top and the outlet is at the bottom of the nozzle, or vice versa. Thus, the direction of the flow could be up-path or down-path. The coolant duct connected to the manifold at the bottom of the nozzle will in this case be very long.

A second previously known design is a so-called double pass flow arrangement. The full double path coolant layout has the inlet and outlet at the same axial location, at the top of the nozzle. The manifolds are placed at the desired position and the ducts are the shortest possible. However it is difficult to find a practical arrangement between manifolds and the entrance to and exits from the wall structure.

A third previously known design is a so-called balanced double pass flow arrangement. The inlet is at the top of the nozzle. The flow is directed in the same direction in two adjacent cooling channels in a first part of the nozzle. One of the channels leads directly to an outlet, which is placed between the top and the bottom of the nozzle. The other channel extends to the bottom of the nozzle. The coolant in the other channel is led to the bottom of the nozzle and thereafter upwards in the first channel to the same outlet. The axial position of the inlet and outlet are separated and hence the access to the wall is good. The outlet manifold needs to be placed a significant distance from the inlet manifold to achieve a close to equal distribution between the channels. Therefore the size of the outlet manifold and its duct is not of minimum size. Unbalance in the flow means inefficient cooling and reduced life. The mass flow distribution in the two flow paths is decisive of the pressure drop. The distribution could vary since small differences in inlets, the channels, turning manifolds and outlets could affect the flow.

It is desirable to achieve a component, which creates conditions for an improved heat exchange and a sufficient design with regard to external coolant ducts and manifolds. The component should be especially suitable for a rocket engine. Especially, the invention aims at a component that creates conditions for arranging the coolant ducts to and from the component in such a way that the size of manifolds and length of the ducts are minimized. Furthermore, the invention aims at a component that creates conditions for placing the manifolds in areas of the component where it is protected from high level of vibration and external flow and heat loads.

Thus, an aspect of the invention is characterized in that at least one second cooling channel in the second portion is closed so that the coolant is at least substantially prevented from entering the closed second cooling channel from a cooling channel in the first portion.

The wording "at least substantially prevented from entering" means that either all coolant flow is prevented from entering or only a very small part, for example maximum 3%, of the coolant flow from the first portion may enter the second cooling channels.

The first portion of the component may thereby be configured for a very high heat load in that it will have optimum cooling efficiency. In the case of a rocket engine nozzle, the heat load is at a maximum in an upper part, wherein the invention creates conditions for an optimum cooling efficiency with no variation in angular direction between individual cooling channels.

Further, the cooling performance is identical between cooling channels for the uppermost part of the nozzle where the heat load is at maximum. This is especially important in case of less efficient cooling medias such as methane.

According to a preferred embodiment of the invention, the second portion of the component comprises twice the number of cooling channels in the first portion. Further, every other cooling channel in the second portion is closed so that the coolant is prevented from entering the closed cooling channels from the cooling channels in the first portion. These features create conditions for sufficient cooling of a component with an increasing width, such as in a component with a circular cross section where a cross section diameter varies in an axial direction of the component.

The component comprises at least one inlet in the first portion for entrance of the coolant and at least one outlet in the second portion for exiting the coolant. Preferably, the outlet is positioned in the closed cooling channel in the second portion and in the vicinity of the closure. In this way, the outlet manifold may be placed very close to the inlet manifold, the main concern being the access to the wall structure to arrange inlet and outlet ports.

Further, a robust flow balance is achieved due to the controlled one-way flow from the inlet to the outlet in relation to the so-called balanced double pass flow arrangement (see above). In other words, any disturbance is less likely to cause problems in the flow balance. Especially, the cooling is less sensitive to differences in pressure drops in the cooling channels. So-called hot spots are non-desirable in the wall structure during engine operation. Hot spots may arise due to a geometrical variation or a thermal variation in the cooling channels. The ability of cooling to handle hot spots is improved with the inventive controlled flow solution since the flow is one-way and pressure balancing is not an issue.

According to a preferred embodiment of the invention, at least one of said cooling channels in the first portion is split into two channels in the second portion, that one of the two split channels is closed and the other channel is open so that the coolant may enter the open cooling channel from the cooling channel in the first portion. Thus, the cooling channel is split up in two channels. However the flow is not split up. One of the split channels is closed. The other split channel is open, preferably to a bottom of the component.

According to an alternative to the last-mentioned embodiment, a width of a cooling channel in the first portion, which coincides with an open cooling channel in the second portion, is substantially the same as a width of the open cooling channel in the second portion in a transition region between the first and second portion.

Preferably an end of a transition wall separating two adjacent channels in the first portion covers the second cooling channel in the second portion and thereby forms the closure. Further, the division wall preferably has an increasing thickness in the cooling channel direction. Such a design creates conditions for a facilitated manufacturing process in that the first and second portions can be manufactured in separate pieces and joined in a later step.

Further preferred embodiments and advantages will be apparent from the following description and drawings.

BRIEF DESCRIPTION OF THE DRAWINGS

The invention will be explained below, with reference to the embodiments shown on the appended drawings, wherein FIG. 1 schematically shows a first embodiment of a rocket engine thrust chamber in a side view, FIG. 2 shows a cut view of the wall structure of the component according to FIG. 1, FIG. 3-6 each shows a cut view of an alternative of a blocking means arrangement for the first embodiment.

DETAILED DESCRIPTION

Figure 3:
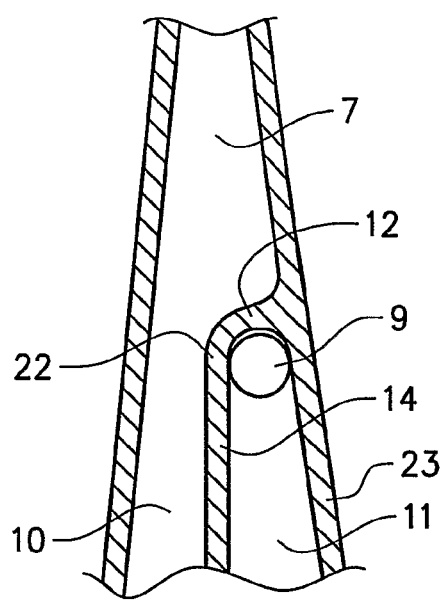

FIG. 1 schematically shows a component 1 configured for being subjected to a high thermal load during operation. More specifically, the component 1 is configured to form a rocket engine component, especially a liquid fuel rocket engine component and particularly a regeneratively cooled rocket engine component in the form of an outlet nozzle. Further, FIG. 1 shows a rocket engine thrust chamber 51 comprising a combustion chamber 52 and the nozzle 1, which is arranged directly downstream of the combustion chamber 52.

The component 1 has an annular shape defining an inner space 2 for gas flow, see arrow 20. More specifically, the component 1 has a tubular shape. The component 1 has a rotary symmetrical shape with regard to a centre axis 3. The component 1 defines an upstream end 4 for entrance of the gas flow and a downstream end 5 for exit of the gas flow. More specifically, the component 1 has a circular cross section, wherein a cross section diameter continuously increases in an axial direction 3 of the component from the upstream end 4 towards the downstream end 5.

The component 1 comprises a load bearing wall structure 6 with cooling channels 7,10,11 adapted for handling a coolant flow. Generally, the cooling channels 7,10,11 are arranged at least substantially in parallel to one another. The cooling channels 7,10,11 are arranged in a side-by-side relationship. Further, the cooling channels 7,10,11 are arranged in a diverging manner from the upstream end 4 towards the downstream end 5.

A plurality of the cooling channels 7,10 generally extend along the contour of the component 1 between the upstream end 4 and the downstream end 5. The cooling channels 7,10 extend in such a direction that a projection of the cooling channel on the centre axis 3 of the component 1 is in parallel with the centre axis 3.

FIG. 2 shows a cross section A-A of the wall structure 6 in FIG. 1. The wall structure 6 comprises an inner wall 26 and an outer wall 27 and a plurality of elongated webs 14 (or division walls) adapted to connect the inner wall 26 to the outer wall 27 dividing the space between the walls into a plurality of cooling channels 10,11.

Further, a first portion 24 of the component 1 comprises a first number of cooling channels 7 and a second portion 25 of the component 1 comprises a second number of cooling channels 10,11. The second portion 25 is arranged adjacent the first portion 24 in such a way that the coolant flow is conveyed from the first portion to the second portion during operation. More specifically, the second portion 25 of the component comprises a larger number of cooling channels than the first portion. In the preferred example, the second portion 25 of the component comprises twice the number of cooling channels in the first portion 24.

At least one first cooling channel 7,10 is adapted to convey the coolant from the first portion 24 of the component to the second portion 25 of the component. Further, at least one second cooling channel 11 in the second portion 25 is closed so that the coolant is at least substantially prevented from entering the closed second cooling channel 11 from a cooling channel 7 in the first portion.

More specifically, every other (second) cooling channel 11 in the second portion 25 is closed so that the coolant is prevented from entering the closed cooling channels 11 from the cooling channels 7 in the first portion 24.

Further, at least one inlet 8 is arranged for entry of the coolant to the channels 7 in the first portion 24 and at least one outlet 9 is arranged for exit of the coolant from the channels 11 in the second portion. A first external duct 16 is arranged to guide the coolant flow to the inlet 8 via a first annular manifold 17 (see dotted lines) positioned around the component 1 and covering the inlet 8. A second external duct 18 is arranged to guide the coolant flow from the outlet 9 via a second annular manifold 19 positioned around the component 1 and covering the outlet 9. The inlet 8 and outlet 9, respectively, is arranged in the external wall 26 of the component.

More specifically, one inlet 8 is provided in each cooling channel 7. The inlet 8 extends over substantially the complete width of the cooling channel 7.

According to the first embodiment shown in FIG. 1, at least one of said cooling channels 7, and preferably all cooling channels 7 extending from the inlets 8, is split into two channels 10,11 at a distance from the inlet 8. The split corresponds to the transition between the first and second portions 24,25. Further, means 12 is provided for closing (blocking) one of the split channels 11 so that the coolant is prevented from entering the closed split channel 11 from the channel 7.

The closing means 12 is positioned at a shorter distance from the upstream end 4 of the component than from the downstream end 5 of the component in order to minimize the length of the second coolant duct 18.

The first component portion 24 comprising the non-split channel 7 is arranged in a section of the wall structure 6 which is configured for being subjected to a higher thermal load than the second portion comprising the split channels 10,11.

The outlet 9 is arranged in the closed, split channel 11. More specifically, the outlet 9 is arranged in the vicinity of the closing means 12. The outlet 9 extends over substantially the complete width of the closed channel 11.

The wall structure 6 is configured for turning the coolant flow in the second portion 25, see arrow 21, in order to flow in an opposite direction in the closed channel 11 in relation to the flow direction in the open channel 10. A division wall 14 is arranged to separate the split channels 10,11. An end 15 of the division wall 14 opposite the closing means 12 is positioned so as to allow the coolant flow from the open split channel 10 to turn around the wall edge and return in the closed split channel 11. More specifically, the wall edge 15 ends at a distance from the downstream end 5 of the component. Thus, there is a one-way flow from the inlet 8 to the outlet 9.

The inner wall 26 and the webs 14 may be formed in one piece, preferably by milling, covering both the first portion 24 and the second portion 25. Thus, the term "portion" should not be interpreted as a separate piece.

The design and arrangement of the closing means 12 is shown, in more detail in FIG. 3. The closing means 12 is formed by a transverse wall part connecting an end 22 of the division wall 14 to an adjacent cooling channel wall 23. More specifically, the transverse wall part 12 is formed integral with the division wall 14 and the adjacent cooling channel wall 23. Thus, a complete closure is achieved. Such a configuration may be achieved by different manufacturing techniques, such as disk and pin milling, disk milling and Electro Discharge Maching (EDM), and disk milling and Metal Deposition (MD). Further, disk milling could be changed to disk grinding. A further alternative manufacturing method is press forging in aluminium and copper.

Preferably, the closing means 12 is configured with an aerodynamic shape, creating as small pressure drop as possible to the coolant flow.

Figure 4:
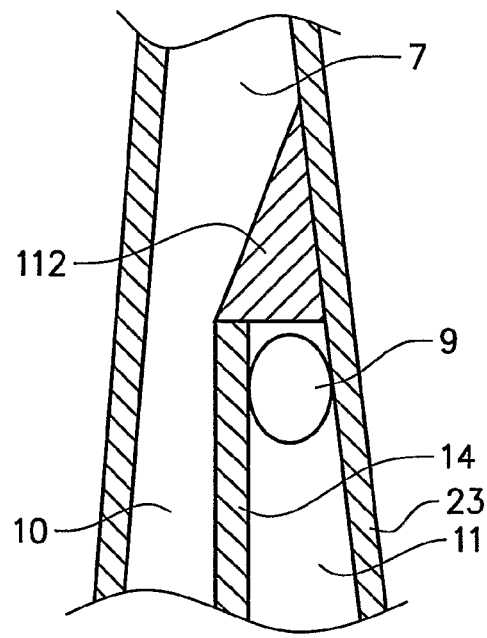

An alternative design of the closing means 112 is disclosed in FIG. 4. The closing means 112 is formed by an insert member configured to bridge the gap between the division wall 14 and the adjacent cooling channel wall 23. A complete closure is achieved in this way.

Figure 5:
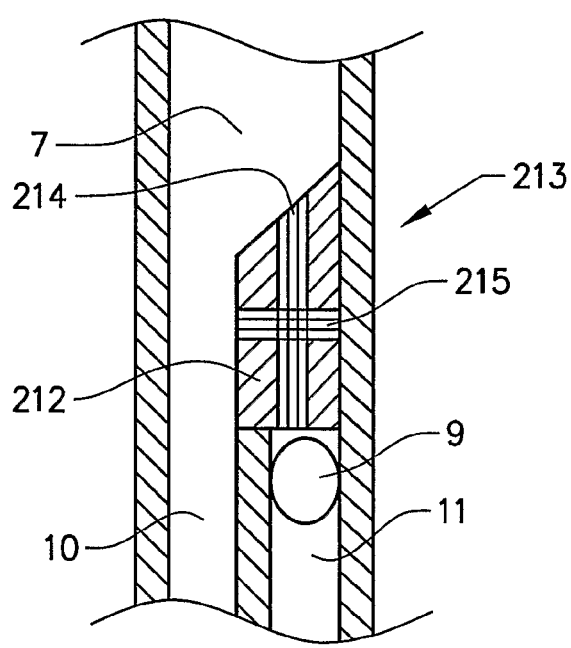

A further alternative design of the closing means 212 is disclosed in FIG. 5. The closing means 212 is formed by an insert member (similar to the second embodiment), which comprises a cooling structure 213 for cooling of the insert member 212 itself. The cooling structure 213 comprises a plurality of first openings 214 extending through the insert member 212. At least one of the first openings 214 is open in a direction towards the inlet 8. Further, the openings extend in a direction substantially in parallel with a longitudinal direction of the cooling channel 7. At least one of the first openings 214 through the insert member 212 is open into the closed cooling channel 11. In this way, a controlled leakage flow can be achieved through the closing means 212 to the outlet 9, which may be advantageous in order to avoid local heat spots. However, the closing means 212 is only configured for a very small leakage flow and the cooling structure 213 is only adapted to cool the closing means (insert member) itself. The leakage flow is limited to only one or a few percent of the total flow from the inlet.

Further, the openings 214 are configured for an obstruction of the leakage flow for controlling the flow. Different flow obstruction configurations are feasible, such as a labyrinth seal, a brush seal or a metallic foam seal.

Further, the cooling structure 213 is adapted to allow passage of particles of a size below a set limit in order to avoid clogging of the openings 214. According to one example, the closing means 212 is designed to allow particles of a size smaller than 1 mm to pass. The insert 212 is fitted with at least one additional, second opening 215 in a transverse direction of the insert 212 in order to secure a cooling function also if the first openings are clogged. The second opening 215 faces the cooling channel 7 in a transverse direction of the cooling channel 7 and communicates with the first openings 214. Thus, the second openings 215 do not directly face the incoming flow from the inlet 8.

Figure 6:
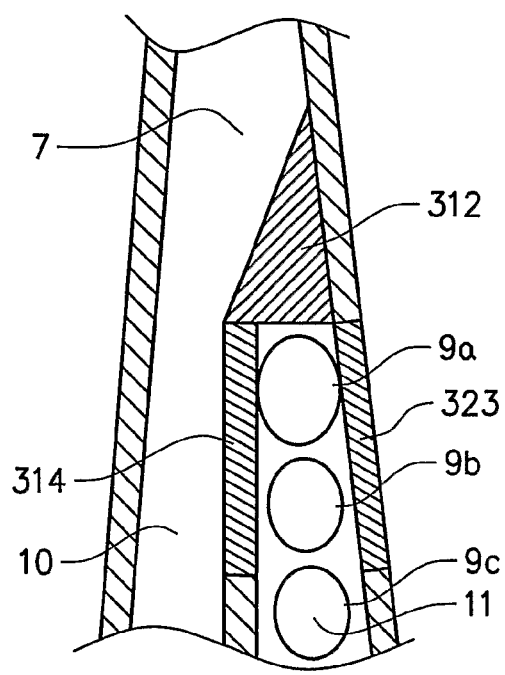

A further alternative design of the closing means 312 is disclosed in FIG. 6. The closing means 312 is at least partly formed by a porous material, wherein cooling of the closing means is achieved. A plurality of outlets 9a, 9b, 9c are arranged in the closed channel 11. Using three outlets will decrease a risk of stagnation points between the outlets. The outlets 9a, 9b, 9c are spaced in a longitudinal direction of the channel 11. Further, the walls 314,323 around the outlets 9a, 9b, 9c are at least partly formed by a porous material, wherein enhanced cooling is achieved.

Figure 7:
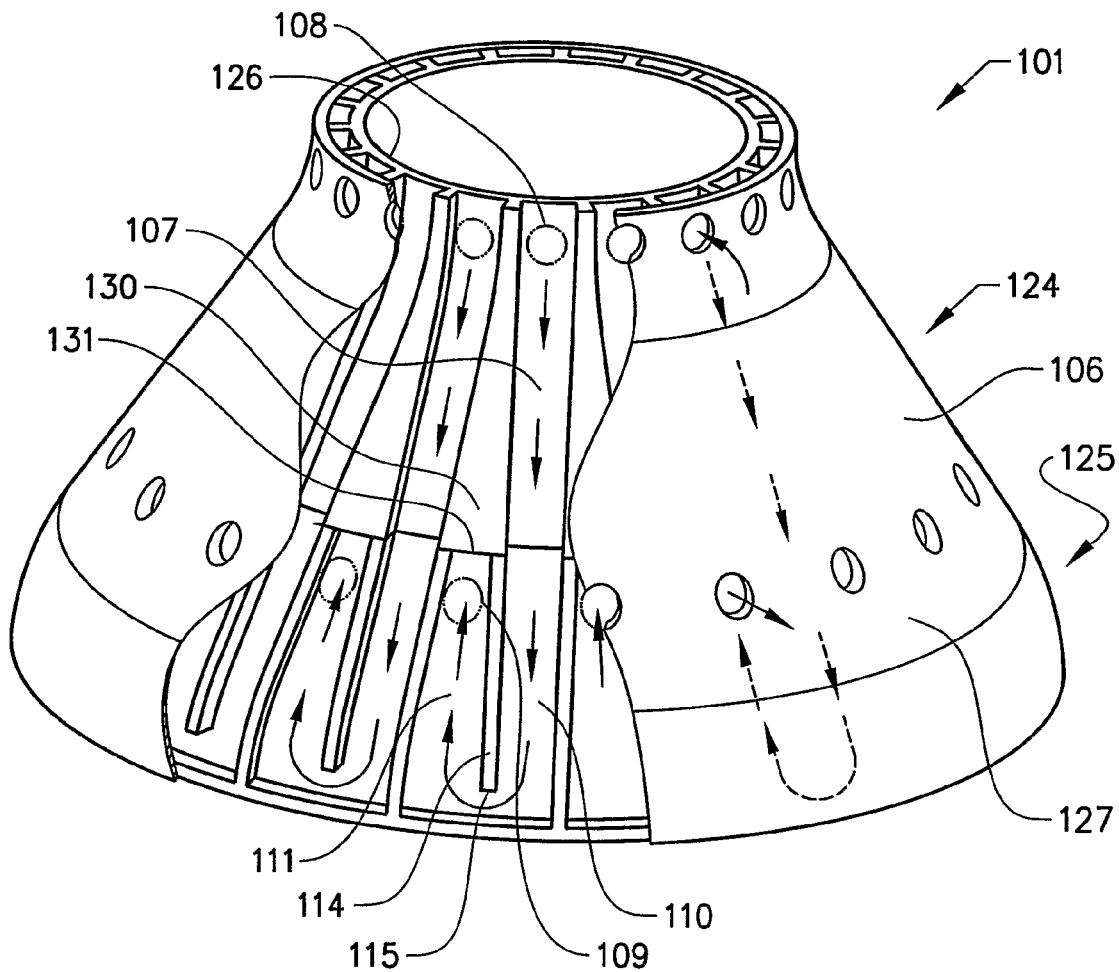
FIG. 7 shows a second embodiment of a rocket engine thrust chamber in a partly cut, perspective view.

FIG. 7 shows a second embodiment of the component 101. The component 101 is formed by applying two cone-shaped, tubular pieces 124,125 (first and second portions) on top of each other and then positioning a cover jacket 127 around the two cone-shaped, tubular pieces 124,125. The first, upper piece 124 comprises an inner wall 126 and a plurality of elongated webs 130, or division walls, spaced in a circumferential direction of the piece 124. Each of the cooling channels 107 is defined by the inner wall 126, two adjacent division walls 130 and the jacket 127, forming an outer wall. The coolant flow direction is indicated with arrows.

The webs 130 have an increasing width in the cooling channel direction towards the second piece 125. More specifically, an end 131 of a division wall 130 separating two adjacent channels 107 in the first, upper piece 124 covers a cooling channel 111 in the second, lower piece 125 and thereby forms a closure. In other words, the width of the wall end 131 fits a distance between two adjacent walls in the lower cone.

Further, a width of a cooling channel 107 in the upper cone 124, which coincides with an open cooling channel 110 in the lower cone 125, is substantially the same as a width of the cooling channel 110 in the lower cone 125 in a transition region between the first and second cone.

Preferably, the upper cone 124 comprises a high conductive material, which allows for a relatively thick material in the division walls 130 between the cooling channels 107.

The invention is not in any way limited to the above described embodiments, instead a number of alternatives and modifications are possible without departing from the scope of the following claims.

According to one alternative embodiment, a plurality of inlets is provided in each cooling channel.

Although the invention has been described above for a rocket engine, also other applications are feasible, like in a wall in an aircraft engine. A further application is feasible where the component does not have to be continuous in the circumferential direction or circular. Thus, the invention may be applied in a curved, or substantially flat application. Further, a plurality of such flat parts may be joined to form a component with a polygonal cross section.

Further, regarding the cooling channel configuration is not limited to straight channels. Instead, the cooling channels may for example be arranged to extend along a helical curve.

The invention claimed is:

1. A component configured for being subjected to a high thermal load during operation, comprising
   a first portion and a second portion defined by a wall structure with cooling channels adapted for handling coolant flow to cool a thrust chamber,
   the first portion comprising at least one first cooling channel, of the cooling channels adapted to convey the coolant between the first portion and the second portion, and
   the second portion comprising at least one second cooling channel of the cooling channels, the at least one second cooling channel being split into a plurality of channels comprising a first channel and a second channel, the first channel being open so that the first channel is in direct flow communication with the at least one first cooling channel and in direct flow communication with the second channel, the second channel being in direct flow communication with the first channel and otherwise being in flow communication with the first cooling channel only directly via a cooling structure between the second channel and the first cooling channel that allows a controlled leakage flow of coolant.

2. A component according to claim 1, wherein the second portion of the component comprises a larger number of second cooling channels than a number of first cooling channels in the first portion.

3. A component according to claim 1, wherein the second portion of the component comprises second cooling channels in a quantity that is twice a number of first cooling channels in the first portion.

4. A component according to claim 1, comprising, a plurality of second cooling channels in the second portion, each second cooling channel of the plurality of second cooling channels being, split into a plurality of channels comprising a respective first channel and a respective second channel and, for each second cooling channel, the first channel being open so that the first channel is in direct flow communication with the at least one first cooling channel and in direct flow communication with the second channel, the second channel being in direct flow communication with the first channel and otherwise being in flow communication with the first cooling channel only via a cooling structure in the second channel that allows a controlled leakage flow of coolant.

5. A component according to claim 1, wherein the component comprises at least one inlet in the first portion for entrance of the coolant and at least one outlet in the second portion for exiting the coolant.

6. A component according to claim 5, wherein the outlet is positioned in the second channel of the at least one second cooling channel in the second portion.

7. A component according to claim 6, wherein the outlet is arranged in the vicinity of the cooling structure.

8. A component according to claim 1, wherein the at least one second cooling channel is configured so that coolant flow in the first channel is in an opposite direction than in the second channel.

9. A component according to claim 1, wherein, for each second cooling channel of the at least one second cooling channel, a division wall is arranged that separates the first channel from the second channel, and an end of the division wall is disposed at an end of the second cooling channel opposite the first portion in a longitudinal direction of the component and is positioned so as to allow coolant flow between the first channel and the second channel to turn around an edge of the division wall.

10. A component according to claim 1, wherein a width of a first cooling channel of the at least one first cooling channel in the first portion, which coincides with a first channel of a second cooling channel of the at least one second cooling channel in the second portion, is substantially the same as a total width of the first channel plus the second channel in a transition region between the first and second portion.

11. A component according to claim 1, wherein, for each second cooling channel of the at least one second cooling channel, a division wall is arranged that separates the first channel from the second channel, and a first end of the division wall is disposed at an end of the second cooling channel opposite the first portion in a longitudinal direction of the component and is positioned so as to allow coolant flow between the first channel and the second channel to turn around an edge of the division wall, and the cooling structure extends through a transverse wall part connecting a second end of the division wall to an adjacent cooling channel wall.

12. A component according to claim 11, wherein the transverse wall part is formed integral with the division wall and the adjacent cooling channel wall.

13. A component according to claim 11, comprising an insert member configured to bridge a gap between the division wall and the adjacent cooling channel wall and through which the cooling structure extends.

14. A component according to claim 11, wherein the cooling structure is adapted to allow passage of particles of a size below a set limit between the at least one first cooling channel in the first portion and the second channel.

15. A component according to claim 10, wherein an end of a division wall separating two adjacent channels in the first portion covers part of the at least one second cooling channel in the second portion and the cooling structure extends through the division wall.

16. A component according to claim 1, wherein the first portion is arranged in a section of the wall structure which is configured for being subjected to a higher thermal load than the second portion.

17. A component according to claim 1, wherein the cooling channels are arranged at least substantially in parallel to one another.

18. A component according to claim 1, wherein a plurality of first cooling in the first portion are arranged in a side-by-side relationship and a plurality of second cooling channels in the second portion are arranged in a side-by-side relationship.

19. A component according to claim 1, wherein the cooling channels are arranged in a diverging manner.

20. A component according to claim 1, wherein the component defines an inner space for gas flow.

21. A component according to claim 20, wherein the component defines an upstream end for entrance of a gas flow and a downstream end for exit of the gas flow and the cooling channels extend between the upstream end and the downstream end.

22. A component according to claim 1, wherein the component has a tubular shape.

23. A component according to claim 1, wherein the component has a rotary symmetrical shape with regard to a center axis.

24. A component according to claim 1, wherein the component has a circular cross section, and a cross section diameter varies in an axial direction of the component and that the cooling channels extend along the contour of the component.

25. A component according to claim 20, wherein at least one of the cooling channels extend in such a direction that a projection of the cooling channel on a center axis of the component is in parallel, with the center axis.

26. A component according to claim 1, wherein the wall structure is configured to be load bearing.

27. A component according to claim 1, wherein the component is configured to form a rocket engine component.

28. A component according to claim 1, wherein the component is configured to form a liquid fuel rocket engine component.

29. A component according to claim 27, wherein the rocket engine component is adapted for a regeneratively cooled rocket engine.

* * * * *